US011436495B2

(12) United States Patent
Wiltshire

(10) Patent No.: US 11,436,495 B2
(45) Date of Patent: Sep. 6, 2022

(54) CHANGE DETECTION IN DIGITAL IMAGES

(71) Applicant: Insitu, Inc., a subsidiary of The Boeing Company, Bingen, WA (US)

(72) Inventor: Ben Wiltshire, Wiltshire (GB)

(73) Assignee: INSITU, INC. A SUBSIDIARY OF THE BOEING COMPANY, Chicago, IL (US)

( * ) Notice: Subject to any disclaimer, the term of this patent is extended or adjusted under 35 U.S.C. 154(b) by 339 days.

(21) Appl. No.: 16/149,925

(22) Filed: Oct. 2, 2018

(65) Prior Publication Data

US 2020/0104719 A1 Apr. 2, 2020

(51) Int. Cl.
*G06K 9/62* (2022.01)
*G06N 3/08* (2006.01)
(Continued)

(52) U.S. Cl.
CPC .......... *G06N 3/084* (2013.01); *G06K 9/6256* (2013.01); *G06K 9/6267* (2013.01);
(Continued)

(58) Field of Classification Search
CPC ............ G06K 9/00624; G06K 9/0063; G06K 9/00664; G06K 9/00765; G06K 9/00771; G06K 9/46; G06K 9/4604; G06K 9/4642; G06K 9/6202; G06K 9/6203; G06K 9/6212; G06K 9/6256; G06K 9/6267; G06T 7/11; G06T 7/223; G06T 7/246; G06T 7/248; G06T 7/251; G06T 2207/10032; G06T 2207/20021; G06T 2207/20076; G06T 2207/20081; G06T 2207/20084;
(Continued)

(56) References Cited

U.S. PATENT DOCUMENTS

| 10,319,094 B1* | 6/2019 | Chen ........................ G06T 7/75 |
| 2010/0092036 A1* | 4/2010 | Das ...................... G06K 9/3241 |
|  |  | 382/103 |

(Continued)

OTHER PUBLICATIONS

Sergey Zagoruyko and Nikos Komodakis, "Learning to Compare Image Patches via Convolutional Neural Networks", IEEE, Proceedings of the IEEE Conference on Computer Vison and Pattern Recognition (CVPR), 2015, pp. 4353-4361 (Year: 2015).*

(Continued)

*Primary Examiner* — Eric Rush
(74) *Attorney, Agent, or Firm* — Quinn IP Law

(57) ABSTRACT

A method for detecting change in a pair of sequential images. The method includes training a feature descriptor based on a generated training set of matching and non-matching image pairs. An imaging subsystem captures a pair of substantially sequential images of a field of view. The pair of captured images is aligned and then transformed into corresponding arrays of patches. A matching and non-matching probability is determined for each pair of adjacent patches based on the feature descriptor. Each pair of patches is classified as matching or non-matching based on a comparison of the matching and non-matching probability. A mask is generated identifying the pairs of patches that indicate change and then displayed overlaid on at least one of the sequential images to indicate change on a user interface.

20 Claims, 8 Drawing Sheets

(51) Int. Cl.
*G06T 7/246* (2017.01)
*G06N 3/04* (2006.01)
*G06V 10/75* (2022.01)
*G06V 10/82* (2022.01)
*G06V 10/70* (2022.01)

(52) U.S. Cl.
CPC ........... *G06N 3/0472* (2013.01); *G06T 7/251* (2017.01); *G06V 10/70* (2022.01); *G06V 10/758* (2022.01); *G06V 10/82* (2022.01); *G06T 2207/20076* (2013.01); *G06T 2207/20084* (2013.01)

(58) Field of Classification Search
CPC ........... G06T 2207/30212; G06T 2207/30232; G06N 3/0472; G06N 3/0481; G06N 3/084; G06N 20/00; G06N 3/0454; G01S 7/414; G01S 7/417; G01S 17/02; G01S 17/04; G01S 17/06; G01S 17/50; G06V 10/16; G06V 10/24; G06V 10/62; G06V 10/70; G06V 10/74; G06V 10/75; G06V 10/751; G06V 10/7515; G06V 10/757; G06V 10/758; G06V 10/759; G06V 10/82; G06V 20/10; G06V 20/13; G06V 20/17; G06V 20/176; G06V 20/182; G06V 20/188; G06V 20/52; G06V 20/70
USPC ........ 382/100, 103, 155–159, 181, 216–219, 382/224, 227, 282, 283; 348/143, 144, 348/148, 152–155; 706/6, 12, 15, 16, 706/20–22, 25–32
See application file for complete search history.

(56) References Cited

U.S. PATENT DOCUMENTS

| | | | |
|---|---|---|---|
| 2016/0078273 A1* | 3/2016 | Hamid | G06K 9/2081 |
| | | | 382/103 |
| 2017/0185872 A1* | 6/2017 | Chakraborty | G06K 9/66 |
| 2018/0018553 A1* | 1/2018 | Bach | G06K 9/6247 |
| 2018/0143275 A1* | 5/2018 | Sofka | G06K 9/6274 |
| 2018/0225834 A1* | 8/2018 | Heikman | G06K 9/6274 |
| 2019/0012526 A1* | 1/2019 | Guo | G06K 9/00261 |
| 2019/0050625 A1* | 2/2019 | Reinstein | G06K 9/4633 |
| 2019/0122103 A1* | 4/2019 | Gao | G06K 9/6273 |
| 2019/0354772 A1* | 11/2019 | Tasli | G06K 9/4623 |
| 2019/0370598 A1* | 12/2019 | Martin | G06K 9/6273 |
| 2020/0013169 A1* | 1/2020 | Higa | G06K 9/38 |

OTHER PUBLICATIONS

Zhenchao Zhang, George Vosselman, Markus Gerke, Devis Tuia, and Michael Ying Yang, "Change Detection between Multimodal Remote Sensing Data Using Siamese CNN", arxiv.org, arXiv:1807.09562v1, Jul. 25, 2018, pp. 1-17 (Year: 2018).*

Yang Zhan, Kun Fu, Menglong Yan, Xian Sun, Hongqi Wang, and Xiaosong Qiu, "Change Detection Based on Deep Siamese Convolutional Network for Optical Aerial Images", IEEE, Geoscience and Remote Sensing Letters, vol. 14, No. 10, Oct. 2017, pp. 1845-1849 (Year: 2017).*

Jure Žbontar and Yann LeCun, "Computing the Stereo Matching Cost with a Convolutional Neural Network", 2015 IEEE Conference on Computer Vision and Pattern Recognition (CVPR), 2015, pp. 1592-1599 (Year: 2015).*

Sergey Zagoruyko, et al., "Learning to Compare Image Patches via Convolutional Neural Networks", Computer Vision Foundation, Jun. 15, 2015, CVPR 2015, 4353-4361.

* cited by examiner

CHANGE DETECTION IN DIGITAL IMAGES

TECHNICAL FIELD

The present disclosure relates generally to systems and methods used in remote sensing using moving platforms such as in manned and unmanned aerial systems.

BACKGROUND

Change detection using remote sensing in high resolution satellite and aerial imagery with a pixel based approach is typically accomplished using a background subtraction technique. A background image is built from multiple images or frames to generate a scene without dynamic objects. The background image is then subtracted from the input images to reveal changes. This method usually requires observing and recording the scene for a period of time and collecting large amounts of data as well as moving the camera to scan the entirety of the scene. Unfortunately, pixel based approaches suffer greatly from occlusion effects such as shadows and weather conditions as well as registration errors which do not generally work well for moving platforms. Feature based approaches, such as Scale Invariant Feature Transform (SIFT) and Gradient Location and Orientation Histogram (GLOH), utilize a feature descriptor that is trained from a training set of images of a feature of interest for object detection in the input images. Feature based approaches have the added benefit of being invariant to image translation, scaling, rotation, and partially to illumination changes over pixel based approaches. However, the feature descriptor is used to perform reliable object identification is not well suited to detect changes in the identified object. Hence, there exists a need for a feature descriptor optimized for change detection rather than object identification.

SUMMARY

In accordance with one aspect of the present disclosure, there is provided a method for detecting change in a pair of sequential images. The method includes the step of generating a training set that has a plurality of images. The method also includes training a feature descriptor to generate a feature map based on the training set. The feature descriptor is configured to identify similarities and changes in input images. Further, the method includes parsing the pair of sequential images through the feature descriptor to generate an updated feature map. The pair of sequential images is then classified according to a resulting feature map of the parsing step.

In accordance with another aspect of the present disclosure, there is provided a system for detecting change in a pair of sequential images. The system includes an imaging sensor that is configured to capture a plurality of images of a field of view and store the images to a memory. The system further includes a training module which is configured to train a feature descriptor to generate a feature map based on a received training set. The training set includes a at least one or a plurality of matching image pairs wherein each pair includes images both known to have a same region in a field of view. The training set also includes at least one or a plurality of non-matching image pairs wherein each pair includes images that are both known to have a differing region in a field of view. The system further includes a detection module that is configured to parse the pair of sequential images through the feature descriptor to produce an updated feature map. A classification module is configured to classify the pair of sequential images based on the updated feature map.

In accordance with another aspect of the present disclosure, there is provided a method for detecting change in a pair of sequential images. The method includes the step of training a feature descriptor based on a training set. The training set includes at least one or a plurality of pairs of matching images and a at least one or a plurality of pairs of non-matching images, each pair of matching images known to have a same region within a field of view and each pair of non-matching images known to have a differing region within a field of view. Further, the method includes capturing, with an imaging subsystem, a before image and an after image of a field of view. The before image is divided into a first array of patches and the after image is divided into a second array of patches. The method includes the step of determining a classification probability for each adjacent pair of patches between the first and second array of patches. The classification probability is based on the feature descriptor. Pairs of patches that are dissimilar are identified based on the corresponding classification probability. The method further includes the step of generating a mask based on the identified pairs of dissimilar patches and displaying the mask on the after image to a user on a display terminal.

Figure 1:
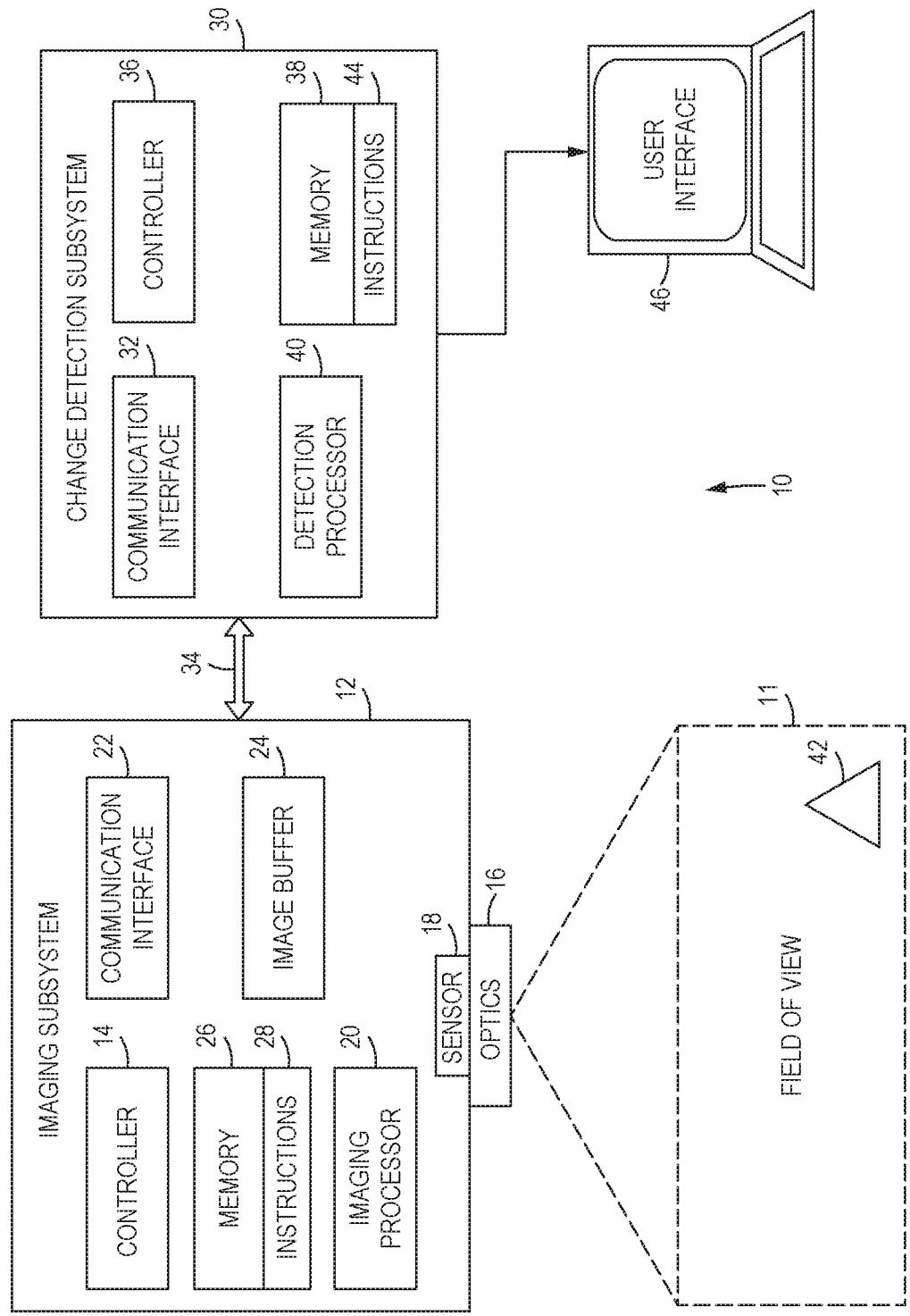
FIG. 1 is a block diagram of a system in accordance with an embodiment of the present disclosure.

While the present disclosure is susceptible to various modifications and alternative constructions, certain illustrative examples thereof will be shown and described below in detail. The disclosure is not limited to the specific examples disclosed, but instead includes all modifications, alternative constructions, and equivalents thereof.

DETAILED DESCRIPTION

The following detailed description will illustrate the general principles of the exemplary system and method, examples of which are additionally illustrated in the accompanying drawings. In the drawings, like reference numbers indicate identical or functionally similar elements.

While the exemplary system and method may be susceptible to embodiments in different forms, there is shown in the drawings, and herein will be described in detail, a specific embodiment for detecting change in object of interest using an image capturing device mounted on an aerial structure, such as an unmanned aerial vehicle (UAV), an aerial platform, a piloted vehicle, or a satellite, with the understanding that the present disclosure is to be considered an exemplification of the principles of the system and method, and is not intended to limit the system and method to that as illustrated and described herein. For example, the exemplary system and method may be implemented in surveillance camera platforms monitoring a scene such as a public area, sporting event, or shopping center. The exemplary system and method can be also be adapted for use in manufacturing environment for safety monitoring and even quality assurance. Therefore, unless otherwise noted, features disclosed herein may be combined together to form additional combinations that were not otherwise shown for purposes of brevity.

The exemplary system and method is configured to detect change in at least two images using a convolutional neural network, the method comprises measuring a weighted relationship of probabilistic differences of a plurality of patches providing a characterized library for optimizing automated decision.

Referring now to FIG. 1, an embodiment for a change detection system 10 is illustrated in accordance with one embodiment of the present disclosure. The system 10 described here in can detect change based on a learning architecture which is inspired by biological processing patterns. learning architectures rely on a cascade of multiple non-linear processing units and transformations in which each successive layer uses the output from the previous layer as an input. The system 10 may be used to determine or detect changes in a scene captured within a field of view 11 of an imaging subsystem 12. In an exemplary embodiment, the imaging subsystem 12 is mounted on an aerial platform such as an UAV. The imaging subsystem 12 includes an imaging controller 14, optics 16, an imaging sensor 18, an imaging processor 20, and a first communication interface 22. The optics 16 includes at least a lens or other optical components to transmit and focus light of the scene within the field of view 11 of the optics 16 to the imaging sensor 18. The imaging sensor 18 senses the focused light from the optics 16 and generates an analog signal therefrom which is then converted to a digital image by the imaging processor 20 which then stores the digital image into an image buffer 24. The communication interface 22 is configured to read the image buffer 24 and transmit the digital images to the change detection subsystem 30 in real-time or as a batch process. Alternatively, the digital image can be stored in imaging memory 26 (e.g. a data storage unit) for later retrieval. The imaging memory 26 is a non-transitory machine readable medium which can at least store the captured digital images as well as machine executable software code such as instructions 28 that are configured to, when executed, to cause the imaging controller 14 to control the optics 16, imaging sensor 18, and imaging processor 20 to capture a digital image of the scene within the field of view 11 of the optics 16. The image memory 26 may be any type of memory, such as volatile memory like random access memory (RAM), dynamic random access memory (DRAM), static random access memory (SRAM), or non-volatile memory like read-only memory (ROM), flash memory, magnetic or optical disks, among other devices used to store data or programs on a temporary or permanent basis.

The imaging subsystem 12 may include a suitable structure for mounting all or part of the subsystem to the aerial platform. For example, the optics 16 and imaging sensor 18 may be mounted onto a two-axis gimbal mechanism that allows the optics to rotate over a field of view of $4\pi$ steradians.

The change detection subsystem 30 also includes a second communication interface 32 which is configured to form a communication link 34 between the first communication interface 22 and the second communication interface 32. The digital image stored in the image buffer 24 or the imaging memory 26 is transferred from the imaging subsystem 12 to the change detection subsystem 30 by way of the communication link 34. In one embodiment, the imaging subsystem 12 and change detection subsystem 30 are both on-board the aerial platform and the communication link 34 is a wired communication link. In another embodiment, the change detection subsystem 30 is remote from the UAV carrying the imaging subsystem 12. For example, the change detection subsystem 30 can be situated on the ground or on another aerial platform and the digital images from the imaging subsystem 12 are transmitted wirelessly thereto. The communication link 34 may be configured according to any number of wireless communication protocols suitable for long range wireless communication such as, for example, radiofrequency communication via a network of communication satellites.

The digital images taken by the imaging subsystem 12 can be still photographs taken in sequence or a video stream. The imaging processor 20 may be configured to separate the video stream into individual images such that the individual images may be transmitted sequentially in real-time. Alternatively, the imaging controller 14 may transmit the digital images as batch of digital images or transmit the video stream in its entirety as a single video stream file which is then separated into individual images by the change detection subsystem 30.

The change detection subsystem 30 includes a system controller 36 which is configured to control the second communication interface 32 to establish a bidirectional communication link 34 with the first communication interface 22 to send and receive data and to store received digital images in a system memory 38. The system controller 36 is also configured to control a detection processor 40. The detection processor 40 is configured to detect change within the field of view 11 in at least two images, such as a pair of substantially sequential images and/or a video sequence. The field of view may or may not include an object of interest 42. In the exemplary embodiment of a UAV aerial platform, the object of interest 42 captured in the field of view 11 may be a vehicle on the side of road. For surveillance purposes, a user may desire to track when and where the vehicle moves. The detection processor 40 is capable of processing a plurality of digital images of the field of view 11 and detects changes in the field of view 11, e.g. detecting movement of an object of interest 42 between as little as two images. It should be noted that the object of interest 42 is part of the field of view 11. The method of detecting change in at least two digital images will be discusses in greater detail below.

Similar to the imaging memory 26, the system memory 38 is a non-transitory machine readable medium which can at least store the transmitted digital images as well as machine executable software code such as instructions 44 that are configured to, when executed, to cause the system controller 36 to control the second communication interface 32, the detection processor 40, and coordinate inputs and outputs with the user interface 46. The software code also includes instructions to control the detection processor 40 in accordance with the method of detecting change as will be further discussed. With reference to the user interface 46, the system controller 36 may receive commands or detection parameters from a user via the input device to alter or adjust the functionality of the change detection method parameters. The system controller 36 is also configured to control the detection processor 40 in a similar fashion via instructions 44 to perform and alter the parameters of change detection method.

The change detection subsystem 30 includes a user interface 46 which includes an input device (e.g. such as a keyboard, mouse, touchscreen, microphone, or gesture-based input device), a display and speakers to provide visual and audio information to a user and to allow the user to input parameters to control the detection processor 40 parameters. The user interface 46 may also include a printer for printing images captured by the system.

Figure 2:
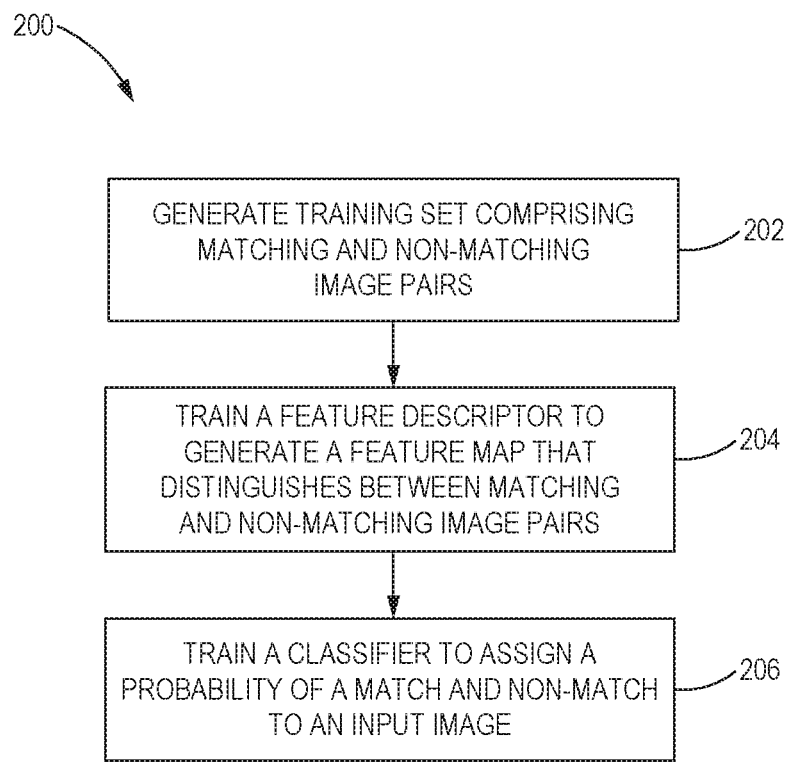
FIG. 2 is a flowchart of an example method for training feature descriptors, according to an example embodiment.
Figure 3:
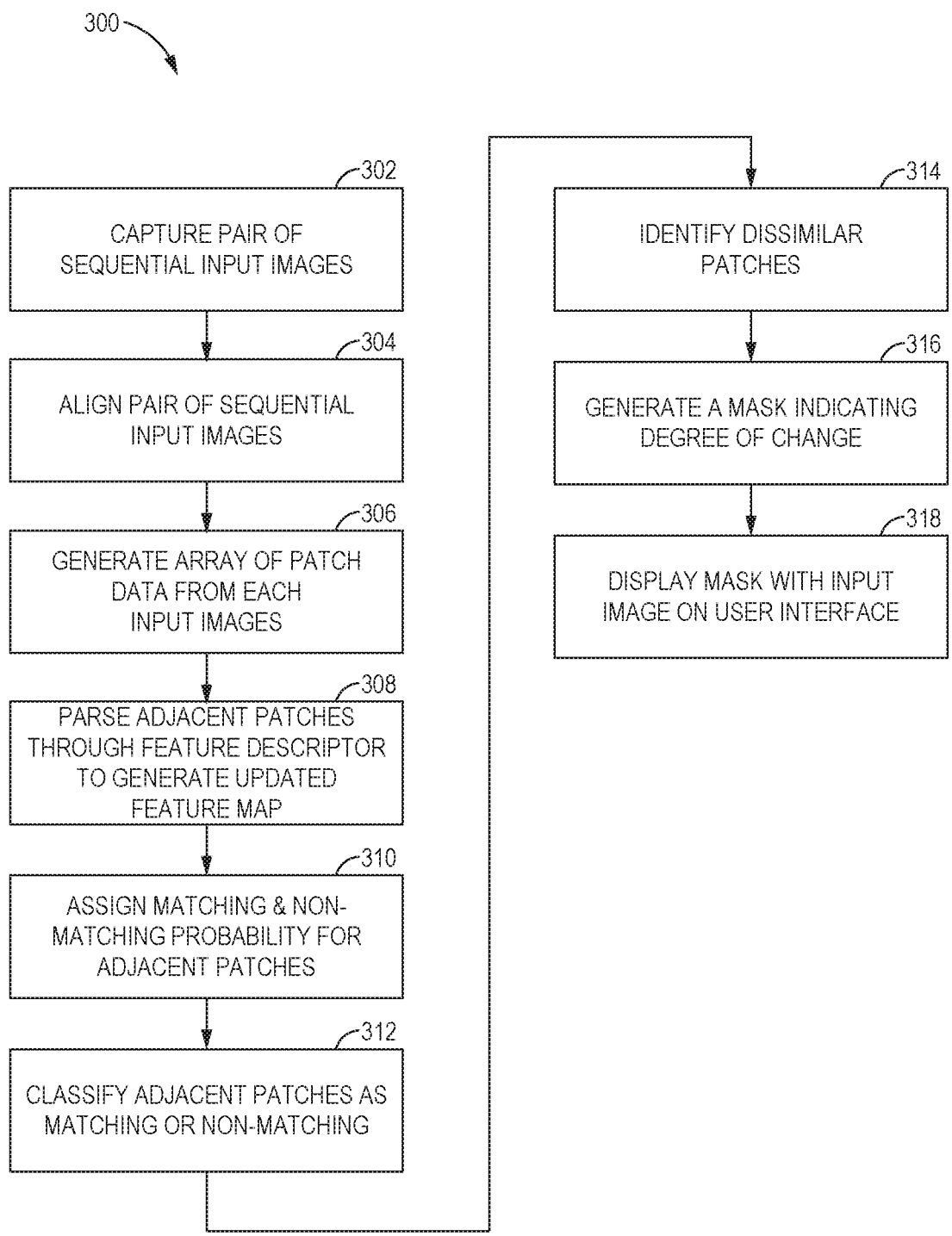
FIG. 3 is a flowchart of an example method for change detection within a scene, according to an example embodiment.

Referring now to FIGS. 2 and 3, the methods 200 and 300 are depicted which details exemplary examples of the method performed by the change detection system 10. In other examples, the change detection system 10 may perform the methods 200 and 300 in any combination of one or more suitable components described herein. FIG. 2 may include one or more operations, functions, or actions as illustrated by one or more blocks 202-206. Similarly, FIG. 3 may include one or more operations, functions, or actions as illustrated by one or more blocks 302-322. Although the blocks are illustrated in sequential order, these blocks may in some instances be performed in parallel, and/or in a different order than those described herein. Also, the various blocks maybe combined into fewer blocks, divided into additional blocks, and/or removed based upon the desired implementation.

Each block 202-206 and 302-322 may represent a portion of program code which includes one or more instructions 44 executed by the system controller 36 for controlling the detection processor 40 to perform the specific functional steps of the methods 200 and 300. As previously stated, the instructions can be stored system memory 38 such a non-transitory computer readable medium, for example, such as computer readable media that stores data for short periods of time like register memory, processor cache, or Random Access Memory (RAM). The computer readable medium may also include non-transitory media, such as secondary or persistent long term storage, like read-only memory (ROM), optical or magnetic disks, or compact-disc read-only memory (CD-ROM), for example. The computer readable media may also be any other volatile or non-volatile storage system. The computer readable medium may be considered a computer readable storage medium, a tangible storage device, or other article of manufacture, for example.

Referring now to FIG. 2, the method 200 in an example for training a matching and non-matching feature descriptor to identify matching or non-matching pairs of images, respectively.

At block 202, the method 200 includes a training module for generating a training set which includes both matching and non-matching pairs of images. The training set includes pairs of images that belong to either a matching class or a non-matching class. Pairs of images in the matching class are identified as a match. For example, matching pairs of images are both identified as images of the same region. While matching images are pairs of images of the same region, they can have at least one varying imaging condition. For example, the two images can be taken from different points of view, the two images can have different illumination, the two images can be taken at different times of the day, the two images can be from different imaging devices, the two images can have different resolution, and the like. By varying the at least one imaging condition, the resultant change detection feature descriptor, which will be discussed in greater detail below, will be substantially immune to the varying imaging conditions and provide improved change detection independent of the varying imaging conditions.

The pairs of images in the non-matching class are indicated as non-matching. For example, the non-matching pairs include images of regions that are not the same. Whereas matching image pairs both include images of the same region. The non-matching image pairs may or may not have a varying image condition. The training of the feature descriptor, as will be later discussed, will not be substantially impacted by varying image conditions between non-matching image pairs because of the disparate region therebetween.

It should be appreciated that the image pairs can be identified or classified as matching and non-matching either automatically or manually. While matching image pairs are of the same region, non-matching pairs can be of two completely arbitrary images so long as the user deems the pair of images non-matching.

In the exemplary embodiment of a UAV aerial platform surveilling land vehicles to detect change in position, the matching image pairs include images of the same geographical location, e.g. a road, but at varying imaging conditions such as at different times of the day, different points of view, with different cameras, or the like. The non-matching image pairs include images of completely distinct geographical locations. However, as previously mentioned, the non-matching image pairs can include two arbitrary images unrelated to aerial or geographical images.

At block 204, the method 200 includes a training module for training a feature descriptor to generate a feature map based on the training set from step 202. The feature map can also quickly distinguish between a matching pair of images, i.e. similarities, and a non-matching pair of images, i.e. changes, with greater accuracy and reliability than previous methods by utilizing both curated matching and non-matching image pairs from the training set to optimize the feature descriptor. The training set is inputted into a two-channel artificial intelligence model, i.e. the training module, wherein each image of a pair is inputted into one of the channels of the model to a train the feature descriptor. The artificial intelligence model acts on both channels simultaneously, converting both input images into a single feature or feature map. At block 206, the artificial intelligence model, i.e. training module, also trains a classifier that takes the feature, generated by the feature descriptor in step 204, and assigns a probability of a match or a non-match to input pair of images. An artificial intelligence model is more reliable and robust to errors such as mislabeled a priori matching and non-matching image pairs in the training set. It should be noted that the larger the curated training set is, the more robust the artificial intelligence model will be at classifying matching and non-matching image pairs.

Once the feature descriptor and classifier are trained, the artificial intelligence model can detect change between pairs of complimentary images based on the classification probability. Complementary images are substantially sequential or consecutive images captured by the imaging subsystem 12. It should be appreciated that a time period may elapse between the complementary pair of images, a number of other images may be captured between the complementary pair of images, the complementary images are immediately consecutive or the like such that the complementary images define a before image and an after image at a selected time index. The time index may correspond to a time stamp associated with the sequence of still images or a video stream captured by the imaging subsystem 12.

The artificial intelligence model can be statistical or machine learning models, e.g., linear classifiers, logistic regression classifiers, latent variable models, artificial neural networks, decision tree learning, inductive logic programming, clustering, reinforcement learning, and Bayesian networks. In an exemplary embodiment, the artificial intelligence model is an artificial neural network such as a convolutional neural network (CNN). However, other learning systems that enable change detection are also contemplated. Neural networking learning systems are a set of automatic learning algorithms that model high level abstraction using a number of non-linear transformations. They use a cascade or layers of non-linear processing units wherein each layer uses the output of the previous layer as an input. Each of the non-linear transformations includes parameters that can be trained as weights through multiple iterations. CNN's are a category of machine learning systems that include a number of intermediate layers that typically consist of convolutional layers, pooling layers, fully connected layers, rectified linear units, and normalization layers. The convolutional layers include parameters or weights that are learned, trained, or updated iteratively via backpropagation. One example of a convolutional neural network according to an exemplary embodiment will be further discussed with reference to FIG. 7 below.

Figure 4:
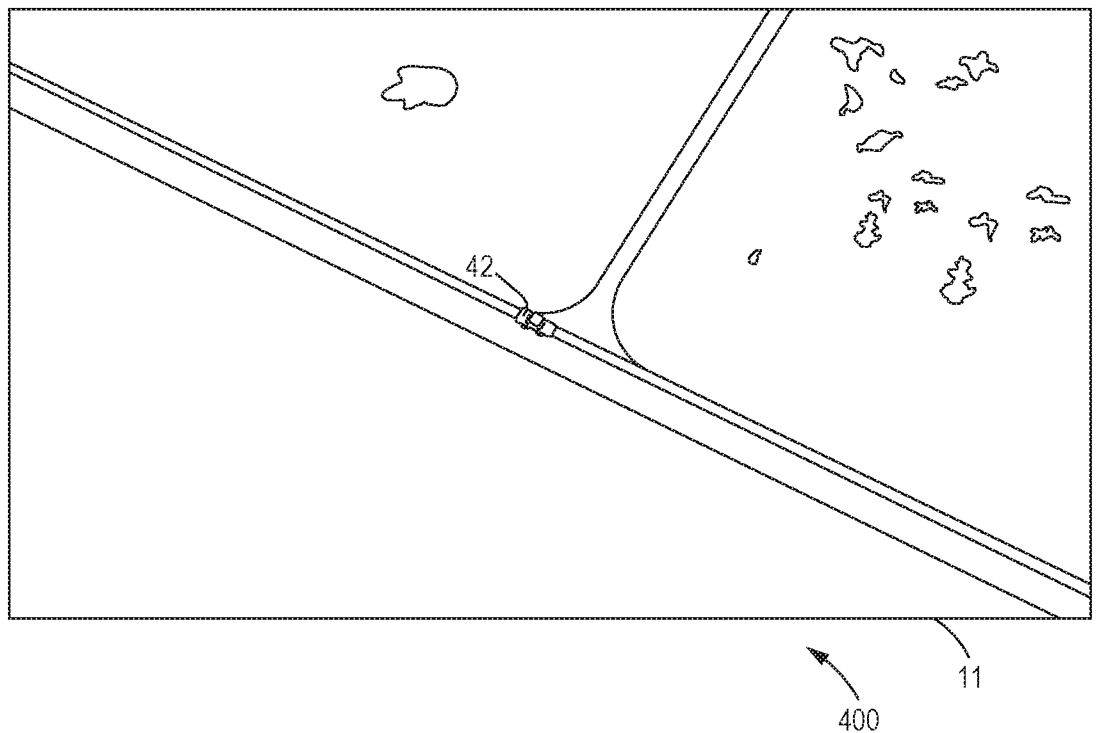
FIG. 4 is a reference image of an object of interest within a field of view, according to an example embodiment.
Figure 5:
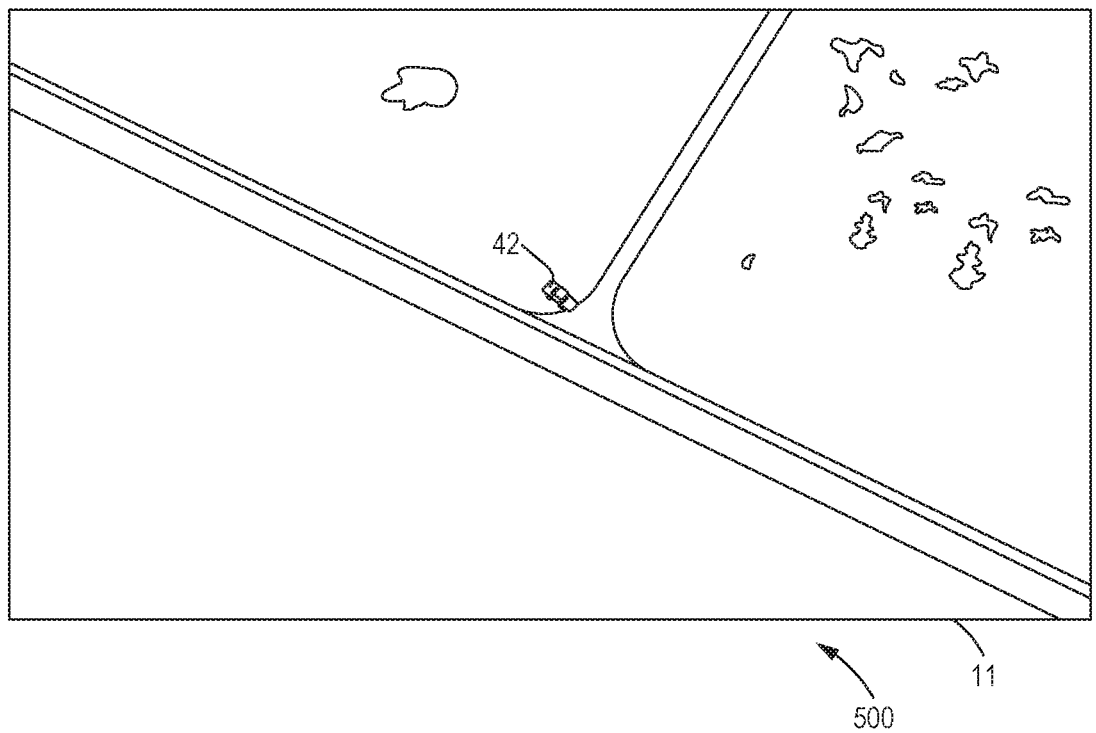
FIG. 5 is a reference image of a changed object of interest within a field of view, according to an example embodiment.

Referring now to FIG. 3, the method 300 in an example for detecting change between a pair of images, for example between substantially sequential images, At block 302, the method 300 includes capturing substantially sequential images with the imaging subsystem 12. In the exemplary embodiment of a UAV aerial platform, the imaging subsystem 12 may capture reference images 400 and 500 as shown in FIGS. 4 and 5, respectively. The image 400 is captured first in a sequence of images prior to capturing image 500, i.e. they are substantially sequential. The sensor 18 of the imaging subsystem 12 which captures the first 400 and second 500 images may be configured as a red-green-blue (RGB)/visible light sensor, an infrared/thermal sensor, a short-wave infrared (SWIR) sensor, an ultraviolet (UV) sensor, a radio frequency (RF)/radar sensor, a multispectral sensor, a hyperspectral sensor, a combination of any of the above, or any other type of sensor configured to detect and resolve the wavelength and the intensity of electromagnetic waves within any portion of the electromagnetic spectrum. However, for the exemplary embodiment the imaging subsystem 12 is configured to capture greyscale images of a field of view 11 or convert one of the previously mentioned image types into a single channel greyscale image.

In the exemplary example, UAV's are often tasked with Intelligence, Surveillance and Reconnaissance (ISR) missions which involve following or tracking a ground-based target. In both images 400 and 500, the field of view 11 includes a scene of a remote intersection with a vehicle as the object of interest 42. As the UAV flies over a scene, a plurality of digital images of the scene having the same resolution is captured by the imaging subsystem 12, namely the optics 16, and are aligned according with the imagery in the field of view 11 by an alignment module, block 304.

At block 306, the method 300 includes a patching module to transform the inputs images 400 and 500 into patches according to a predetermined kernel size. The patching module generates an array of patch data for the captured the first 400 and second 500 input images. It is generally desirable to generate patch data of each image and parse adjacent patches of the captured images 400 and 500 through the feature descriptor from step 204. The patches may or may not overlap according to a predetermined stride parameter. Adjacent patches refer to patches that have the same patch location in both images of a corresponding pair of input images.

The trained feature descriptor is applied to each pair of adjacent patches to generate a feature map to identify a feature that is present in the adjacent patches. The feature descriptor outputs a feature map or activation map that describes an apparent feature in each of the two images in a pair based on a number of parameters that are predetermined and can be dynamically updated during training and/or parsing through feedback, recurrent, backpropagation, and the like mechanisms. At block 308, the method 300 includes a detection module for parsing the pair of sequential images through the feature descriptor of block 204 to generate an updated feature map. In other words, the feature descriptor is applied densely over the input images 400, 500 by identifying a feature in each pair of adjacent patches according to the trained feature map. Each pair of adjacent patches or corresponding patches between the pair input images are parsed through the feature descriptor. The feature descriptor is a two channel feature descriptor which parses each adjacent patch simultaneously or substantially simultaneously to improve parsing time. Once the feature descriptor has parsed all of the patches, the output of the feature descriptor is an updated feature map or activation map as previously described. In this manner, as the feature descriptor parses new sequential input images, the feature descriptor and resultant feature map is updated to improve the matching and non-matching detection.

At block 310, the trained classifier determines a classification probability for each pair of corresponding images. The classifier assigns a matching probability for each pair of adjacent patches which represents a confidence level of similarity (e.g. similarity probabilities) between the patches. The classifier also determines a non-matching probability for each pair of adjacent patches which represents a confidence level of dissimilarity (e.g. change probabilities) between the patches. The matching and non-matching classification of probabilities together sums to approximately 1.

At block 312, the method 300 includes a classification module to classify each pair of patches according to the updated feature map and the resultant probability that is greater. For example, if the matching probability is greater than 50%, the non-match probability is less than 50%, and the classifier classifies the pair of adjacent patches as a match. Conversely, if the matching probability is less than 50%, the non-matching probability is higher than 50%, and the classifier classifies the pair of adjacent patches as a non-match. While in the example a 50% threshold is established for the matching and non-matching probabilities, other thresholds are also contemplated as well such as a sliding scale and the like.

The classifier can also determine a confidence level for each classification based on a comparison between the matching probability and the non-matching probability of the corresponding pair of patches. For example, if a difference between the matching and non-matching probability is high, then the confidence of the classification can determined as high. Vice versa, if the difference is low then the resultant confidence is determined to be low. It should be appreciated that other comparison methods are also contemplated to determine a confidence of the classification. In the embodiment in which patches overlap, the corresponding probabilities and resultant confidence values can be composited based on a neighboring probabilities and/or confidence values.

Figure 6:
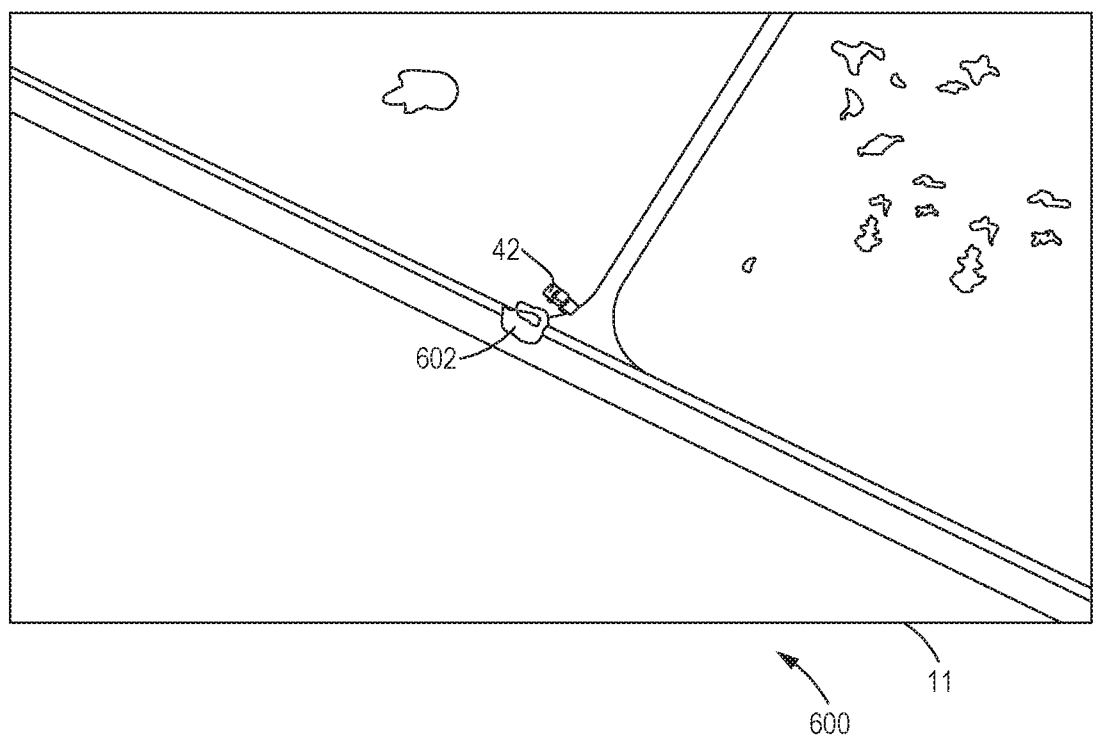
FIG. 6 is a reference image of a mask that indicates change within a field of view, according to an example embodiment.

The pairs of patches classified as non-matching indicate a change in that corresponding patch location between the pair of input images 400 and 500. At block 314, the method 300 includes an identification module for identifying dissimilar patches based on the classification probability from block 312. For each pair of non-matching patches, the corresponding patch in the second array of patches, i.e. the subsequent image, is identified as dissimilar. In block 316, the method 300 includes a masking module to generate a mask 602 based on the identified dissimilar patches from the classification step 312. The mask 602 identifies a change in the corresponding patch locations and a degree of change between the input images 400 and 500. The degree of change can include information such as color mapping based on a corresponding classification confidence level associated with the corresponding patch. The mask 602 can then be overlaid on top of the latter of two input images, e.g. image 500, as shown in reference image 600 of FIG. 6. If a pair of adjacent patches is identified as non-matching in the classification step 312, the mask 602 is generated with pixel locations corresponding to the pixel locations of the patch in question. The pixel values of the mask 602 are determined and then assigned based on at least one of the non-matching probability and the corresponding classification confidence from step 310. The mask 602 can indicate the degree of change based on the pixel values assigned in the mask. Other parameters can also be displayed on the mask such as time elapsed indicated by a time value.

At block 318, the mask 602 overlaid on the reference image 500 is displayed on the user interface 46 for inspection by the user. It should also be appreciated that all of the steps of the methods 200 and 300 can be displayed on the user interface 46 for inspection by the user.

Figure 7:
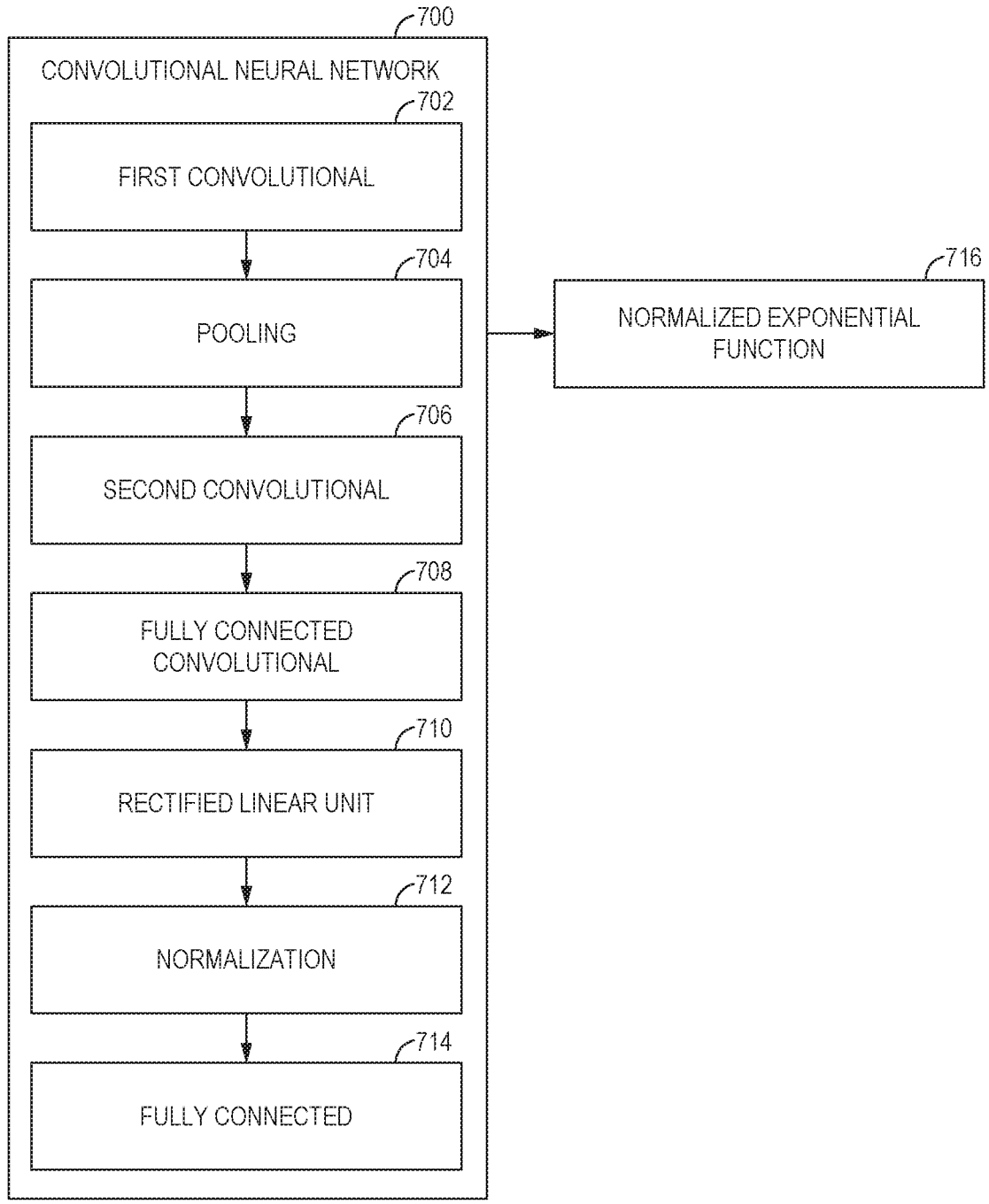
FIG. 7 illustrates an example of a convolutional neural network, according to an example embodiment.

With reference to FIG. 7, an exemplary embodiment of a convolutional neural network 700 for training a change detection feature descriptor is presented. As previously stated, in a neural network learning method or architecture, as illustrated in the flow chart of FIG. 7, the output of the preceding layer acts as an input in the proceeding layer. The advantage of a CNN over other machine learning architectures is that the reliance of convolutional layers reduces the number of learned parameters by acting on tiles or patches of each input image instead of the entire image as a whole. The output classification error is then back-propagated to adjust the parameters. In the CNN 700, the method includes a First Convolutional Block 702. A convolutional layer consists of a number of learnable parameters which will be discussed in further detail with reference to FIGS. 8A-8B. The convolutional layer acts to reduce a large dimension image into a smaller dimension activation map based on a predetermined kernel (e.g. filter dimension) and stride parameter and thus reduce the memory footprint of the CNN 700. At block 704 of the CNN 700, a Pooling layer acts on the output of the First Convolutional Block 702 to reduce the number of parameters and computation in the CNN 700. For example, a pooling layer may act to down sample the output of the previous layer by outputting a specified factor within a filter dimension at a certain stride such. Pooling factors may include a maximum or a minimum factor; however, other pooling factors are also contemplated.

Continuing with the CNN 700 of FIG. 7, block 708 is a Fully Connected Convolutional layer 708 which operates to connect each activation in the current layer to all of the activations in the previous layer. This is typically achieved by a matrix multiplication followed by a bias offset. The CNN 700 next includes a Rectified Linear Unit 710 which applies the non-saturating activation function to increase the non-linear properties of the CNN 700 without affecting the First and Second Convolutional blocks 702, 706. The Rectified Linear Unit 710 is then followed by a Normalization Layer 712 which acts to normalize the output of the previous layer in a predetermined range in order to increase the overall speed of the CNN 700. The final layer of the CNN 700 is a Fully Connected layer 714. As previously stated, each block 702-714 may represent a portion of program code which includes one or more instructions 44 executed by the system controller 36 for controlling the detection processor 40 to perform the specific functional steps of the CNN 700. Although the blocks are illustrated in sequential order, these blocks may in some instances be performed in a different order than those described herein. Also, the various blocks maybe combined into fewer blocks, divided into additional blocks, and/or removed based upon the desired implementation. For example, the First Convolutional Block 702 and Second Convolutional Block 706 may include a number of layers in itself such as at least one Convolutional Layer, Rectified Linear Unit, and Local Response Normalization layers. Each of the blocks 702-714 includes a number of parameters than can be optimized via backpropagation based on an error between the classification output of the Fully Connected Layer 714 and the classification of the input.

Once the matching and non-matching feature descriptors are trained using the CNN 700, sequential input images can be inputted to determine a matching and non-matching probability for each pair of patches of the input images. The output of the CNN 700 is parsed through a Normalized Exponential Function 716, e.g. a softmax probability layer, which corresponds to the Classification Block 316 in method 200. As previously stated, the Classification Block 312 classifies each of the patches of the pair of input images 400, 500 as either matching or non-matching. The added step of the Normalized Exponential Function 716 and the corresponding Classification Block 312 goes beyond traditional CNN's why typically detect similarities between input images. Typically, a CNN outputs a probability at the Fully Connected Layer which is back-propagated into the parameters of the various convolutional filter layers to identify similarities between input images. The method 200, 300 includes a further classification step 310 which goes beyond detecting similarities at the fully connected layer and detects change between input images.

It should be appreciated that a user can adjust the parameters of any one of the CNN 700 layers 702-714 using the user interface 46. For example, the Pooling layer 704 parameters can be adjusted to change the scale of the object of interest 42 being detected, thus altering the granularity of the change detection method 200.

Figure 8A:
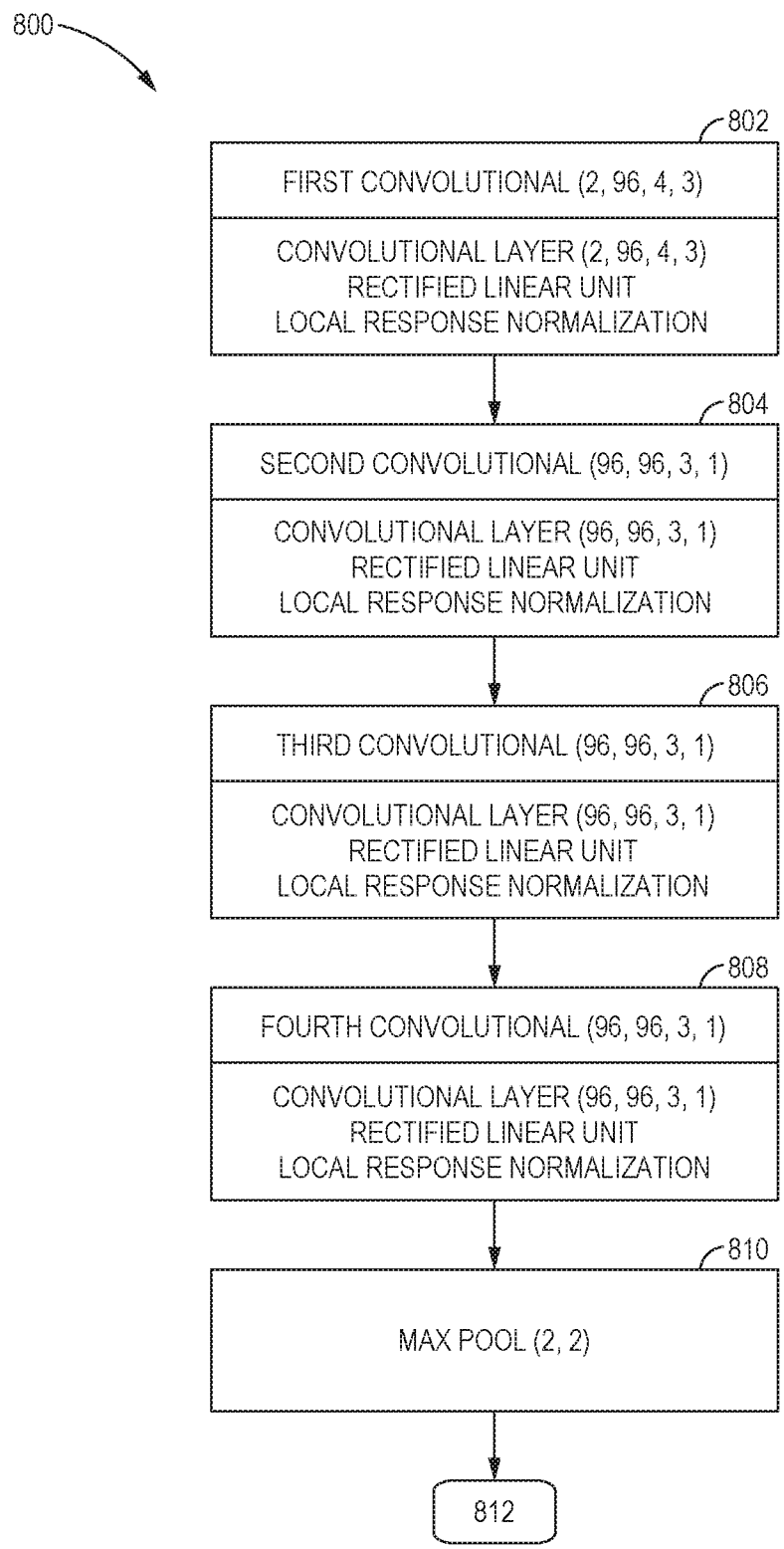
FIGS. 8A and 8B illustrate another example of a convolutional neural network, according to an example embodiment.
Figure 8B:
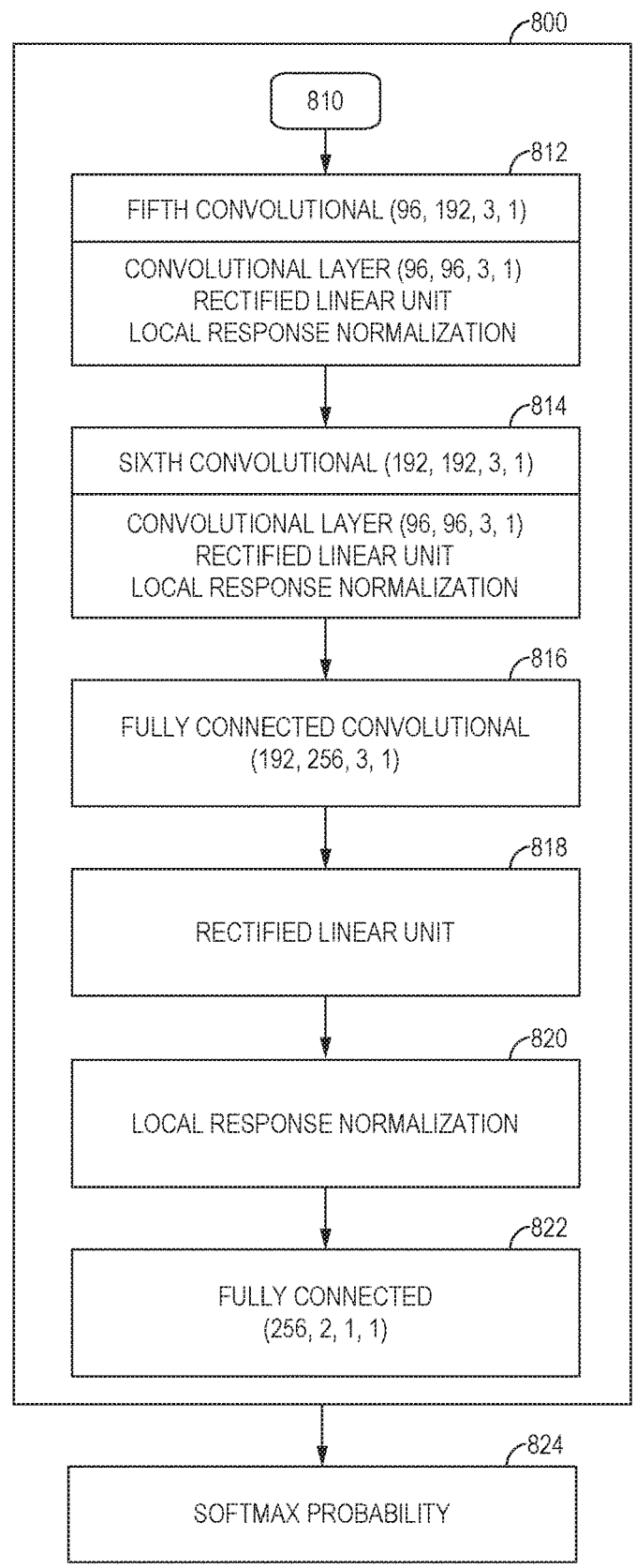

With reference to FIGS. 8A-8B, another example of a CNN 800 is illustrated with parameters which correspond to input image dimensions as well as desired patch data dimensions. The parameters (i,f,d,s) which correspond to filter dimension i, number of convolutional filters f, size of filter d, and stride length s. The parameters for the various layers will change slightly due to the nature of the output of the various layers. For example, the first convolutional block 802 includes a filter dimension of i=2, number of convolutional filters f=96, size of filter d=4, and a stride of s=3. The convolutional block 802 may also be a bank of layers which also includes a convolution layer with parameters (2,96,4,3), which correspond to the convolutional block 802 parameters, and a rectified linear unit followed by a local response normalization layer. The second convolutional block 804 has parameters (96,96,3,1) which corresponds to the output of the preceding convolutional block 802. The second convolutional block 804 may also be a bank of layers which includes a convolutional layer with parameters (96,96,3,1), followed by a rectified linear unit, and then followed by a local response normalization. Similarly, third and fourth convolutional blocks 806, 808 have the same parameters as (96,96,3,1) as the second convolutional block 804. In block 810, a Max Pooling layer acts to down sample the output of the previous layer by outputting the largest value within a filter dimension at a certain stride. In block 810, the Max Pooling layer has parameters (d,s) which refer to dimension of 2 and a stride 2 in the CNN 800. The Max Pooling layer 810 is followed by a Fifth and Sixth Convolutional Blocks 812, 814 with parameters (96,192,3,1) and (192,192,3,1), respectively. Next in the cascade is a Fully Connected Convolutional layer 816 with parameters (192,256,3,1), a Rectified Linear Unit 818, and a Local Response Normalization 820. The final layer in the CNN 800 is the Fully Connected Layer 822 with parameters (256,2,1,1). The output of the CNN 800 is a matching probability and non-matching probability that corresponds to block 310 from the change detection method 300 of FIG. 3. The matching and non-matching probabilities can be parsed through a normalized exponential function such as a Softmax Probability 824 function (e.g. a normalized exponential function as in block 716) to classify image patches that are either matching or non-matching.

The embodiments of this invention described in detail and by reference to specific exemplary embodiments of the change detection system are within the scope of the appended claims. It is contemplated that numerous other modifications and variations of the change detection system may be created taking advantage of the disclosed approach. In short, it is the applicant's intention that the scope of the patent issuing herefrom be limited only by the scope of the appended claims.

What is claimed is:

1. A method for detecting change in a pair of sequential images, the method comprising:
   generating a training set having a plurality of pairs of images, wherein the training set includes at least one pair of non-matching images both known to have a differing region within a field of view;
   training a feature descriptor to generate a feature map based on the training set, wherein:
      the feature map identifying similarities and changes in a plurality of pairs of input images;
      the feature descriptor is trained using a convolutional neural network;
      the convolutional neural network has a single branch; and
      the convolutional neural network includes at least one first convolutional bank, a pooling layer, a second convolutional bank, a fully connected convolutional layer, a rectified linear unit, a normalization layer, and at least one fully connected layer;
   training a classifier to classify the feature map between a match and a non-match;
   parsing the pair of sequential images through the feature descriptor to generate an updated feature map;
   classifying the pair of sequential images based on a result of the parsing and the updated feature map;
   assigning a matching probability and a non-matching probability to the pair of sequential images based on a result of parsing the pair of sequential images through the feature descriptor;
   comparing the matching probability with the non-matching probability of the pair of sequential images;
   determining a degree of change of the pair of sequential images based on the comparing between the matching probability and the non-matching probability; and
   displaying the degree of change to a user of a display terminal.

2. The method according to claim 1, wherein the training set includes at least one pair of matching images both known to have a same region in the field of view.

3. The method according to claim 1, wherein the classifying of the pair of sequential images is further based on the comparing of the matching probability with the non-matching probability.

4. The method according to claim 1, further comprising: aligning the pair of sequential images according to the field of view.

5. The method according to claim 1, wherein the at least one first convolutional bank, the pooling layer, the second convolutional bank, the fully connected convolutional layer, the rectified linear unit, the normalization layer, and the at least one fully connected layer of the convolutional neural network are arranged in a cascading order.

6. The method according to claim 1, wherein:
   the at least one first convolutional bank comprises five first convolutional banks; and
   each of the five first convolutional banks and the second convolutional bank includes a convolutional layer, followed by a rectified linear unit, followed by a normalization layer.

7. The method according to claim 1, further comprising: adjusting one or more parameters of the pooling layer according to a scale of an object of interest with respect to a dimension of the pair of sequential images.

8. The method according to claim 1, wherein the classification is based on a normalized exponential function classifier.

9. A system for detecting change in a pair of sequential images, the system comprising:
   an imaging sensor configured to capture the pair of sequential images;
   a training module configured to train a feature descriptor to generate a feature map based on a training set received by the training module, wherein:
      the training set includes at least one pair of matching images both known to have a same region within a field of view and at least one pair of non-matching images both known to have a differing region within the field of view;
      the feature descriptor is trained using a convolutional neural network;
      the convolutional neural network has a single branch; and
      the convolutional neural network includes at least one first convolutional bank, a pooling layer, a second convolutional bank, a fully connected convolutional layer, a rectified linear unit, a normalization layer, and at least one fully connected layer;
   a detection module configured to parse the pair of sequential images through the feature descriptor to produce an updated feature map;
   a classification module configured to classify the pair of sequential images based on the updated feature map, wherein the classification module is further configured to:

assign a matching probability and a non-matching probability to the pair of sequential images based on the updated feature map; and compare the matching probability with the non-matching probability of the pair of sequential images;

a masking module configured to determine a degree of change between the pair of sequential images based on the comparison between the matching probability and the non-matching probability; and a display terminal configured to display the degree of change with the pair of sequential images.

10. The system according to claim 9, wherein the classification of the pair of sequential images is further based on the comparison of the matching probability with the non-matching probability.

11. The system according to claim 9, further including: an alignment module configured to align the pair of sequential images according to a sensor field of view of the imaging sensor.

12. The system according to claim 9, wherein the training module includes a neural network configured to train first feature descriptors and second feature descriptors of the feature map.

13. The system according to claim 9, wherein one or more parameters of the pooling layer are adjusted according to a scale of an object of interest with respect to a dimension of the pair of sequential images.

14. The system according to claim 9, wherein the classification module includes a normalized exponential function classifier configured to classify the pair of sequential images.

15. A method for detecting change in a pair of sequential images, the method comprising:

training a feature descriptor to generate a feature map based on a training set having a plurality of pairs of matching images and a plurality of pairs of non-matching images, wherein:

each pair of the plurality of matching images is known to have a same region within a field of view;

each pair of the plurality of non-matching images is known to have a differing region within the field of view;

the feature descriptor is trained using a convolutional neural network;

the convolutional neural network includes at least one first convolutional bank, a pooling layer, a second convolutional bank, a fully connected convolutional layer, a rectified linear unit, a normalization layer, and at least one fully connected layer; and the convolutional neural network has a single branch;

capturing, with an imaging subsystem, a before image and an after image of the field of view;

transforming the before image into a first array of patches and the after image into a second array of patches;

determining a classification probability of each of a plurality of adjacent pairs of patches between the first array of patches and the second array of patches based on the feature map, wherein the determining the classification probability includes assigning a matching probability and a non-matching probability to each of the plurality of adjacent pairs of patches;

identifying one or more pairs of patches among the plurality of adjacent pairs of patches that are dissimilar based on the classification probability;

generating a mask based on the one or more pairs of patches identified as dissimilar;

displaying the mask overlaid on the after image to a user on a display terminal;

comparing the matching probability with the non-matching probability of each of the plurality of adjacent pairs of patches;

determining a plurality of degrees of change of the plurality of adjacent pairs of patches based on the comparing between the matching probability with the non-matching probability of each of the plurality of adjacent pairs of patches; and displaying the plurality of degrees of change to the user on the display terminal.

16. The method according to claim 15, wherein:

the mask identifies a change between the before image and the after image based on the mask; and the mask includes a plurality of pixel values based on a corresponding classification probability.

17. The method of claim 16, wherein the step of displaying the mask includes:

determining a degree and a direction of movement based on the mask; and displaying the degree and the direction of the movement to the user on the display terminal.

18. The method according to claim 16, wherein:

the plurality of pairs of matching images in the training set includes one or more first pairs of images known to have a same point of view of a first object; and the plurality of pairs of non-matching images in the training set includes one or more second pairs of images known to have a varying point of view of a second object.

19. The method according to claim 15, further comprising:

classifying each of the plurality of adjacent pairs of patches based on the comparing of the matching probability with the non-matching probability of each of the plurality of adjacent pairs of patches.

20. The method according to claim 15, further comprising:

aligning each of the plurality of adjacent pairs of patches according to the field of view.

* * * * *